(12) United States Patent
Hermalyn et al.

(10) Patent No.: US 12,330,116 B2
(45) Date of Patent: Jun. 17, 2025

(54) SYSTEMS FOR CAPTURING EMISSIONS

(71) Applicant: Thalo Labs, Inc., Brooklyn, NY (US)

(72) Inventors: Brendan Hermalyn, Brooklyn, NY (US); John Kolaczynski, Brooklyn, NY (US); Samuel Patterson, Brooklyn, NY (US); Mihir Juvvadi, Brooklyn, NY (US); Thomas Evenat, Brooklyn, NY (US); Peter Schultz, Providence, RI (US)

(73) Assignee: Thalo Labs, Inc., Brooklyn, NY (US)

( * ) Notice: Subject to any disclaimer, the term of this patent is extended or adjusted under 35 U.S.C. 154(b) by 0 days.

(21) Appl. No.: 18/466,402

(22) Filed: Sep. 13, 2023

(65) Prior Publication Data
US 2023/0415097 A1    Dec. 28, 2023

Related U.S. Application Data

(63) Continuation of application No. 18/096,529, filed on Jan. 12, 2023, now Pat. No. 12,121,853.
(Continued)

(51) Int. Cl.
*B01D 53/62* (2006.01)
*B01D 53/00* (2006.01)
*B01D 53/34* (2006.01)

(52) U.S. Cl.
CPC .......... *B01D 53/62* (2013.01); *B01D 53/005* (2013.01); *B01D 53/346* (2013.01);
(Continued)

(58) Field of Classification Search
CPC .... B01D 53/62; B01D 53/005; B01D 53/346; B01D 2251/604; B01D 2257/504;
(Continued)

(56) References Cited

U.S. PATENT DOCUMENTS

| 4,211,541 A | 7/1980 | Fernandez |
| 5,837,040 A | 11/1998 | Caughron et al. |
| 2005/0160913 A1* | 7/2005 | Hrycak ............. B01J 20/28033 96/243 |
| 2006/0113690 A1 | 6/2006 | Huddart et al. |
| 2008/0264250 A1* | 10/2008 | Pfeffer .................. C01F 11/464 95/189 |

(Continued)

OTHER PUBLICATIONS

International Search Report and Written Opinion prepared by the US Patent Office in International Application No. PCT/US23/10720, dated Jul. 6, 2023.

*Primary Examiner* — Jennifer Dieterle
*Assistant Examiner* — Phillip Y Shao
(74) *Attorney, Agent, or Firm* — McDonnell Boehnen Hulbert & Berghoff LLP

(57) ABSTRACT

A system for directly capturing and measuring greenhouse gasses from a mixture of gasses over a wide range of concentrations from ambient air to combustion exhaust products including: an emissions capture reaction vessel; a reaction media container configured to house a volume of reaction media, the reaction media configured to extract a constituent gas from gas flowing through the emissions capture reaction vessel and capture constituent gas; an intake and exhaust manifold configured to receive and release, respectively a portion of a gas stream via a first access tap on the exhaust stack; a computer system comprised of sensors and actuators connected to a network to directly measure efficiency and uptake of a system, and a fan arranged within the housing and configured to influence the amount and speed of the gas stream processed.

18 Claims, 6 Drawing Sheets

Related U.S. Application Data

(60) Provisional application No. 63/298,940, filed on Jan. 12, 2022.

(52) U.S. Cl.
CPC .. *B01D 2251/604* (2013.01); *B01D 2257/504* (2013.01); *B01D 2258/0283* (2013.01)

(58) Field of Classification Search
CPC ........ B01D 2258/0283; B01D 53/0454; B01D 2251/404; B01D 2251/602; B01D 2251/606; B01D 2252/204; B01D 2253/204; B01D 53/30; Y02C 20/40
See application file for complete search history.

(56) References Cited

U.S. PATENT DOCUMENTS

| | | |
|---|---|---|
| 2010/0229720 A1 | 9/2010 | Sonwane et al. |
| 2011/0198055 A1 | 8/2011 | Meirav et al. |
| 2011/0265648 A1 | 8/2011 | Meirav et al. |
| 2011/0277490 A1 | 11/2011 | Meirav |
| 2012/0222556 A1* | 9/2012 | Filipovic .................. B01J 20/12 96/121 |
| 2014/0326428 A1 | 11/2014 | Meirav et al. |
| 2019/0299154 A1 | 10/2019 | Meirav et al. |
| 2019/0314534 A1 | 10/2019 | Dufresne et al. |

\* cited by examiner

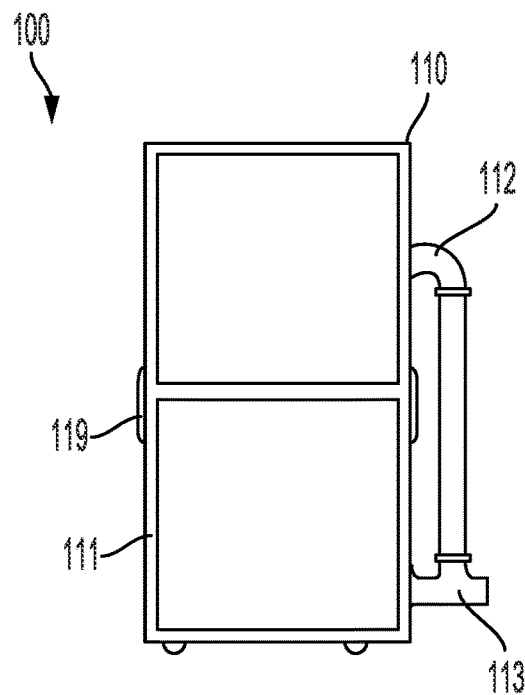
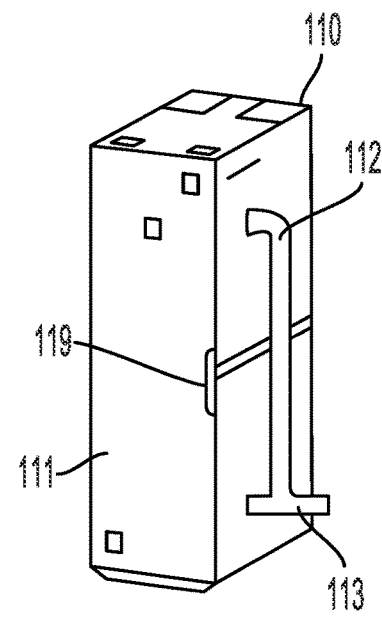
FIG. 2A
FIG. 2B
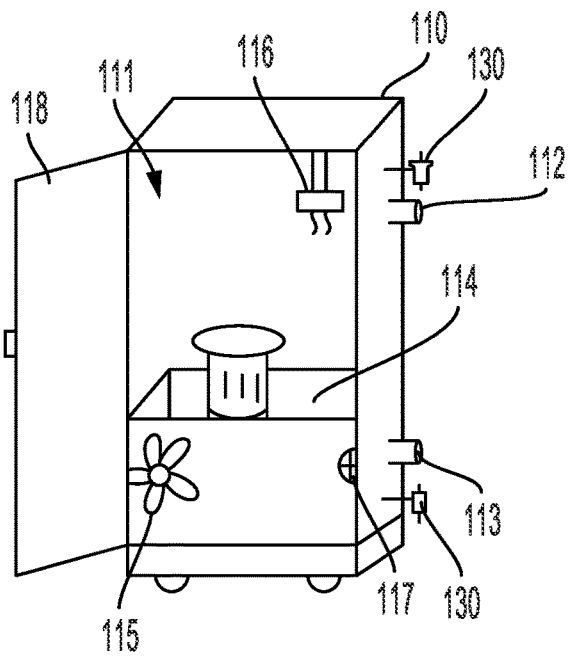
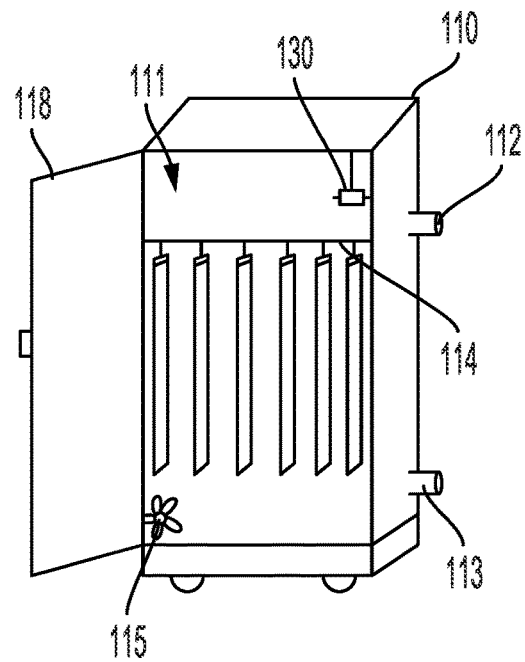
FIG. 2C
FIG. 2D

SYSTEMS FOR CAPTURING EMISSIONS

CROSS-REFERENCE TO RELATED APPLICATIONS

This application is a continuation of and claims priority to U.S. application Ser. No. 18/096,529, filed on Jan. 12, 2023, which claims the benefit of U.S. Provisional Application No. 63/298,940, filed on Jan. 12, 2022, each of which is incorporated in its entirety by this reference.

TECHNICAL FIELD

This invention relates generally to the field of emissions capture and more specifically to a new and useful system for capturing emissions in the field of emissions capture.

BRIEF DESCRIPTION OF THE FIGURES

FIGS. 2A, 2B, 2C, and 2D are schematic representations of variations of the system;

DESCRIPTION OF THE EMBODIMENTS

Figure 1:
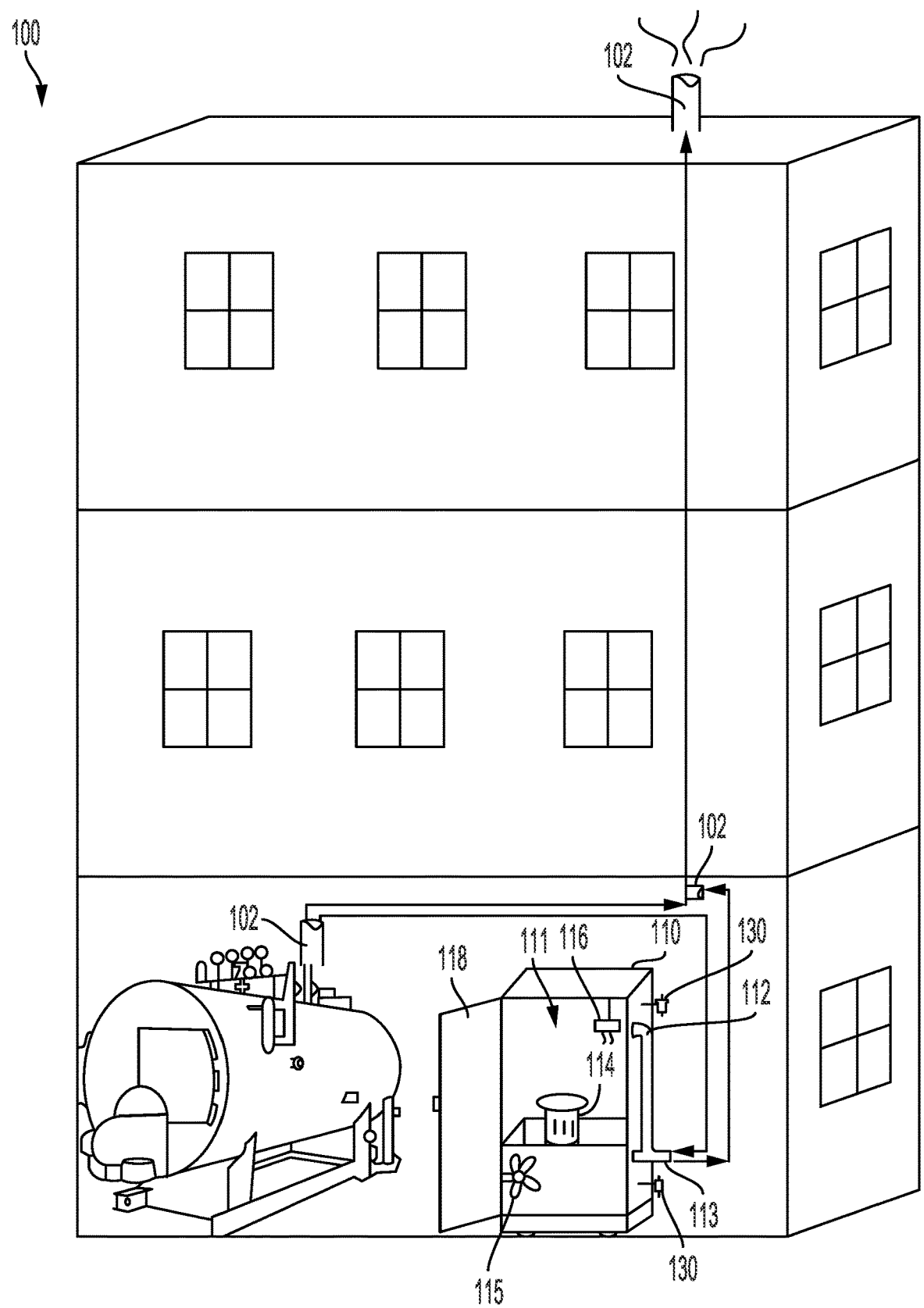
FIG. 1 is a flowchart representation of a system.

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

As shown in FIGS. 1-6, a system 100 for directly capturing emissions from an exhaust stack 102 in a building includes: an emissions capture reaction vessel 110; a housing 111; a reaction media container 114; a housing inlet 113; a housing outlet 112; and a fan 115.

The emissions capture reaction vessel 110 can be arranged proximal the exhaust stack 102 and includes: a housing 111; a reaction media container 114 arranged within the housing 111 and configured to house a volume of reaction media, the reaction media configured to extract a constituent gas from flowing through the emissions capture reaction vessel 110 and capture constituent gas; a housing inlet 113 arranged on the housing 111 and configured to receive a portion of an exhaust gas stream, exhausting through the exhaust stack 102 and inbound to the emissions capture reaction vessel 110, via a first access tap at a first height on the exhaust stack 102 and configured to feed the portion of the exhaust gas stream toward the reaction media container 114; a housing outlet 112 arranged on the housing 111 and configured to return the portion of the exhaust gas stream, exiting the reaction media container 114, back to the exhaust stack 102 via a second access tap at a second height, greater than the first height, on the exhaust stack; and a fan 115 arranged within the housing 111 and configured to influence the portion of the exhaust gas stream from the housing inlet 113, over the reaction media container 114, and through the housing outlet 112.

Figure 3:
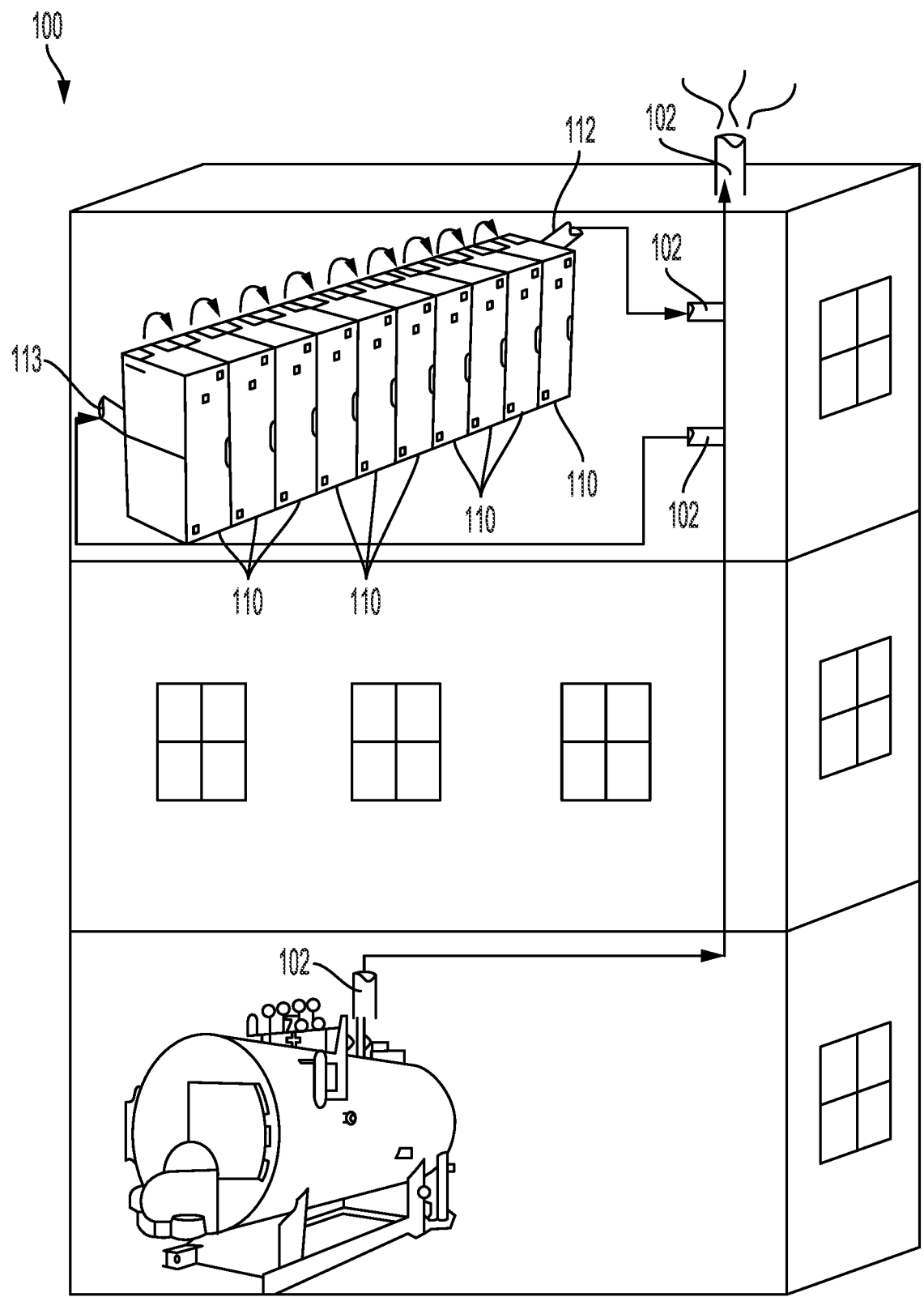
FIG. 3 is a flowchart representation of one variation of the system.

As shown in FIG. 3, one variation of the system 100 includes a first emissions capture reaction vessel 110 and includes: a first housing 111; a first reaction media container 114 arranged within the first housing 111 and configured to house a volume of reaction media, the reaction media configured to extract a constituent gas from gas flowing through the first emissions capture reaction vessel 110 and capture constituent gas; a first housing inlet 113 arranged on the first housing 111 and configured to receive a portion of an exhaust gas stream, exhausting through the exhaust stack 102 and inbound to the first emissions capture reaction vessel 110, via a first access tap at a first height on the exhaust stack 102 and configured to feed the portion of the exhaust gas stream toward the reaction media container 114; a first housing outlet 112 arranged on the first housing 111 and coupled to a second housing inlet 113 of a second emissions capture reaction vessel 110. The system 100 further includes a second emissions capture reaction vessel 110 and includes: a second housing 111; a second reaction media container 114 arranged within the second housing 111 and configured to house the volume of the reaction media, the reaction media configured to extract the constituent gas from gas flowing through the second emissions capture reaction vessel 110 and capture constituent gas; a second housing inlet 113 arranged on the second housing 111 and configured to return the portion of the exhaust gas stream, exiting the second reaction media container 114, back to the exhaust stack 102 via a second access tap at a second height, greater than the first height, on the exhaust stack 102.

Figure 4:
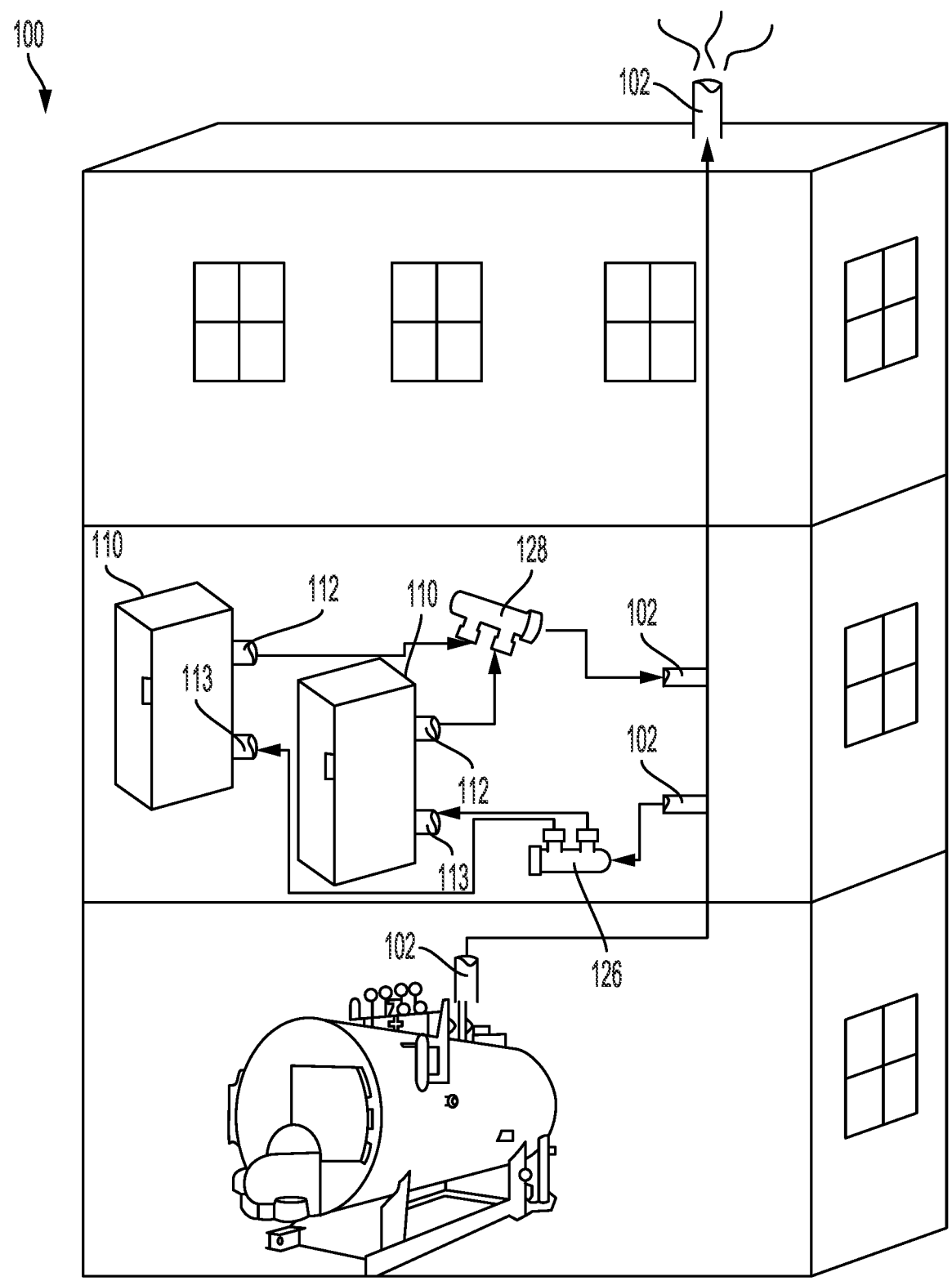
FIG. 4 is a flowchart representation of one variation of the system.

As shown in FIG. 4, one variation of the system 100 includes: a housing inlet manifold 126 coupled to a first access tap at a first height on an air supply; a housing outlet manifold 128 coupled to a second access tap at a second height, greater than the first height, on the air supply 102; and a first emissions capture reaction vessel 110. The first emissions capture reaction vessel 110 includes: a first housing 111; a first reaction media container 114 arranged within the first housing 111 and configured to house a volume of reaction media, the reaction media configured to extract a constituent gas from gas flowing through the first emissions capture reaction vessel 110 and capture constituent gas; a first housing inlet 113 arranged on the first housing 111, coupled to the housing inlet manifold 126, and configured to receive a first portion of a gas stream from the air supply via the housing inlet manifold 126; and a first housing outlet arranged on the first housing 111, coupled to the housing outlet manifold 128, and configured to return the first portion of the gas stream back to the air supply 102 via the housing outlet manifold 128. The system 100 also includes a second emissions capture reaction vessel 110 and includes: a second housing 111; a second reaction media container 114 arranged within the second housing 111 and configured to house the volume of the reaction media, the reaction media configured to extract the constituent gas from gas flowing through the second emissions capture reaction vessel 110 and capture constituent gas; a second housing inlet 113 arranged on the second housing 111, coupled to the housing inlet manifold 126, and configured to receive a second portion of the gas stream from the air supply 102 via the housing inlet manifold 126; and a second housing outlet 112 arranged on the second housing 111, coupled to the housing outlet manifold 128, and configured to return the second portion of the gas stream back to the air supply via the housing outlet manifold 128.

2. Applications

Generally, the system 100 includes an emissions capture reaction vessel 110 that includes: a housing 111; a reaction media container 114; a housing inlet 113; a housing outlet 112; and a fan 115. The system 100 can also include: a set of sensors 130 (e.g., gas sensors, temperature sensors, gas flow sensors); a controller 150; and/or a remote computer system that cooperate to: capture a portion of an exhaust gas stream exhausting through an exhaust stack 102 coupled to a utility system—such as a boiler, a furnace, a water heater, a space heater, an air heater, a drying machine, a fireplace, a generator, a cogeneration device—located within and/or on a building (e.g., educational building, industrial building) from a first access tap on the exhaust stack 102; absorb constituent gas (e.g., carbon dioxide) from this portion of the exhaust gas stream and capture constituent gas (e.g., carbon dioxide) via reaction media (e.g., a metal oxide or hydroxide solid) housed within the reaction media container 114 of the emissions capture reaction vessel 110; and return the portion of the exhaust gas stream (e.g., processed gas) back into a second access tap on the exhaust stack 102.

More specifically, the emissions capture reaction vessel 110 can include: a housing 111; a housing inlet 113 configured to receive the portion of the exhaust gas stream from the first access tap at a first height on the exhaust stack 102; a reaction media container 114 arranged within the housing and configured to house reaction media. The reaction media can: extract a constituent gas (e.g., carbon dioxide) from the exhaust gas stream; and capture the constituent gas (e.g., carbon dioxide) for sequestering during a future time period. The emissions capture reaction vessel 110 also includes a housing outlet 112 configured to return the portion of the exhaust gas stream back into a second access tap at a second height, greater than the first height, on the exhaust stack 102.

In one implementation, the system 100 can be configured to include a set of emissions capture reaction vessels 110 (e.g., 3 emissions capture reaction vessels, 10 emissions capture reaction vessels, 20 emissions capture reaction vessels) to capture carbon corresponding to carbon emissions (e.g., 2,000 parts-per-million of carbon dioxide, 10,000 parts-per-million of carbon dioxide, 80,000 parts-per-million of carbon dioxide) from an exhaust stack 102 connected to a utility system located within and/or on an educational building.

In one variation, the system 100 can be configured to include a set of emissions capture reaction vessels 110 configured to capture carbon from a low carbon dioxide concentration emitting exhaust stack 102 connected to a furnace located within and/or on a building. In another variation, the system 100 can be configured to include a set of emissions capture reaction vessels 110 configured to capture carbon from a high carbon dioxide concentration emitting exhaust stack 102 connected to a boiler located within and/or on an industrial building.

Furthermore, the controller 150 can cooperate with a remote computer system to: read timeseries concentrations of the portion of the exhaust gas stream from a gas sensor 130, gas flow rates from a gas flow rate sensor 130, and temperatures from a temperature sensor 130 during a processing cycle; monitor gas flow rate, mass flux, and temperature via the set of sensors (e.g., gas sensors, gas flow rate sensors, temperature sensors); execute actions (e.g., generate notifications) indicating removal and replacement of reaction media housed within the reaction media container 114 of the emissions capture reaction vessel 110; selectively trigger actuators—such as a fan 115, a heating element 116 and/or a valve 140—within the system 100 and thereby achieve minimal to no generation of constituent gases (e.g., carbon monoxide, nitrogen oxide, sulfur oxide) and combustion of gas within the system 100 and/or within the building during a processing cycle.

In one variation, the system 100 can include an emissions capture reaction vessel 110 that includes: a housing 111; a reaction media container 114; a housing inlet 113; a housing outlet 112; a fan 115; a set of sensors 130 (e.g., gas sensors, temperature sensors, gas flow sensors); a controller 150; and/or a remote computer system that cooperate to capture a portion of greenhouse gasses from an air supply within a building (e.g., ambient indoor air or located near or in the flow of a circulating HVAC system or air handler) and/or outside of a building (e.g., an industrial building, a sports arena, a data center, a manufacturing facility, a stadium). Furthermore, the system 100 can process both: combustion exhaust gas (e.g., when a boiler or other building system is in operation); and non-combusted gas (e.g., when the boiler or other building system is inactive).

3. System

As described above, the system 100 includes an emissions capture reaction vessel 110 that can be arranged proximal an exhaust stack 102 in a building and includes: a housing 111; a reaction media container 114 arranged in the housing 111 and configured to house a volume of a reaction media; a housing inlet 113 arranged on the housing 111 and configured to receive a portion of the exhaust gas stream via a first access tap at a first height on the exhaust stack 102; a housing outlet 112 arranged on the housing 111 and configured to return the portion of the exhaust gas stream (e.g., processed gas), exiting the reaction media container 114, back to the exhaust stack 102 via a second access tap on the exhaust stack 102; from the housing 111 to the exhaust stack 102; and a fan 115 arranged within the housing 111 and configured to extract (e.g., pull) gas from the exhaust stack 102 into the housing inlet 113 and configured to influence the portion of the exhaust gas stream from the housing inlet, over the reaction media container 114, and through the housing outlet 112. The system 100 can also include a heating element 116, a filter 117, a door 118, an interlock 119, a set of couplers 120, and/or a valve 140.

3.1 Housing Inlet+Housing Outlet+Reaction Media Container

The emissions capture reaction vessel 110 includes: a housing 111; a reaction media container 114 arranged within the housing 111 and configured to house a volume of reaction media (e.g., sorbent); a housing inlet 113 arranged on the housing 111; and a housing outlet 112 arranged on the housing 111.

In one implementation, the housing inlet 113 is arranged on the housing 111 and configured to receive a portion of an exhaust gas stream, exhausting through the exhaust stack 102 and inbound to the emissions capture reaction vessel 110, via a first access tap at a first height on the exhaust stack 102 and configured to feed the portion of the exhaust gas stream toward the reaction media container 114. The reaction media container 114 is arranged within the housing 111 and is configured to house a volume (e.g., 80 kg, 100 kg) of reaction media. The reaction media can extract (e.g., absorb, adsorb) a constituent gas (e.g., carbon dioxide) from the portion of the exhaust gas stream flowing through the emissions capture reaction vessel 110 and capture the constituent gas (e.g., carbon dioxide) for sequestration. The housing outlet 112 is arranged on the housing 111 and configured to return the portion of the exhaust gas stream, exiting the reaction media container 114, back to the exhaust stack 102 via a second access tap at a second height, greater than the first height, on the exhaust stack 102.

In one variation, the reaction media container 114 can include a baghouse—such as a shaker baghouse, a reverse air baghouse, a pulse jet baghouse—that includes a set of bags configured to house the volume of reaction media (e.g., calcium oxide, hydroxides, amines, metal organic framework). The reaction media can capture the constituent gas and convert the constituent gas into a carbon product (e.g., carbonate, compressed liquefied carbon dioxide, elemental carbon, ethanol, calcium carbonate) during a processing cycle. Once the total constituent gas absorbed by the reaction media approaches a constituent gas capacity (e.g., maximum capacity of the reaction media), a bag in the set of bags within the baghouse can be removed from the reaction media container 114 and replaced with a bag configured to house the volume of new reaction media. Alternatively, the reaction media container 114 can include any other container (e.g., tube, tray, bucket, bottle) configured to house any other volume of reaction media within the housing 111 of the emissions capture reaction vessel 110 and can be replaced once the total constituent gas absorbed by the reaction media approaches the constituent gas capacity.

Furthermore, the system 100 can include an external reaction media container 114 configured to house a second volume of reaction media, the reaction media can extract (e.g., absorb, adsorb) a constituent gas (e.g., carbon dioxide) from the portion of the exhaust gas stream flowing through the emissions capture reaction vessel 110 into the external media container 114 and return the portion of the exhaust gas stream based into the housing inlet 113 of the emissions capture reaction vessel 110.

3.2 Fan

The emissions capture reaction vessel 110 can also include a fan 115. The fan 115 is arranged within the housing 111 and configured to influence the portion of the exhaust gas stream from the housing inlet 113, over the reaction media container 114, and through the housing outlet 112.

In one variation, the fan 115 can be configured to influence the portion of the exhaust gas stream flowing through the housing 111 of the emissions capture reaction vessel 110 at a first speed in order to reduce carbon monoxide generation and/or combustion of gas moving through the system 100.

In another variation, the fan can be configured to influence the mass flux of the exhaust gas stream from the housing inlet 113, over the reaction media container 114, and through the housing outlet 112.

3.3 Heating Element+Filter

The emissions capture reaction vessel 110 can also include a heating element 116 and/or a filter 117. The heating element 116 can be arranged within the housing 111 at the housing outlet 112 of the emissions capture reaction vessel 110 and can be configured to increase the temperature of gas moving through the emissions capture reaction vessel 110. The filter 117 can be arranged within the housing 111 at the housing inlet 113 of the emissions capture reaction vessel 110 and can be configured to remove constituent gases (e.g., nitrogen oxide, sulfur oxide, carbon monoxide) from gas entering the housing inlet 113 of the emissions capture reaction vessel 110 prior to commencement of a processing cycle.

3.4 Valve

Figure 5:
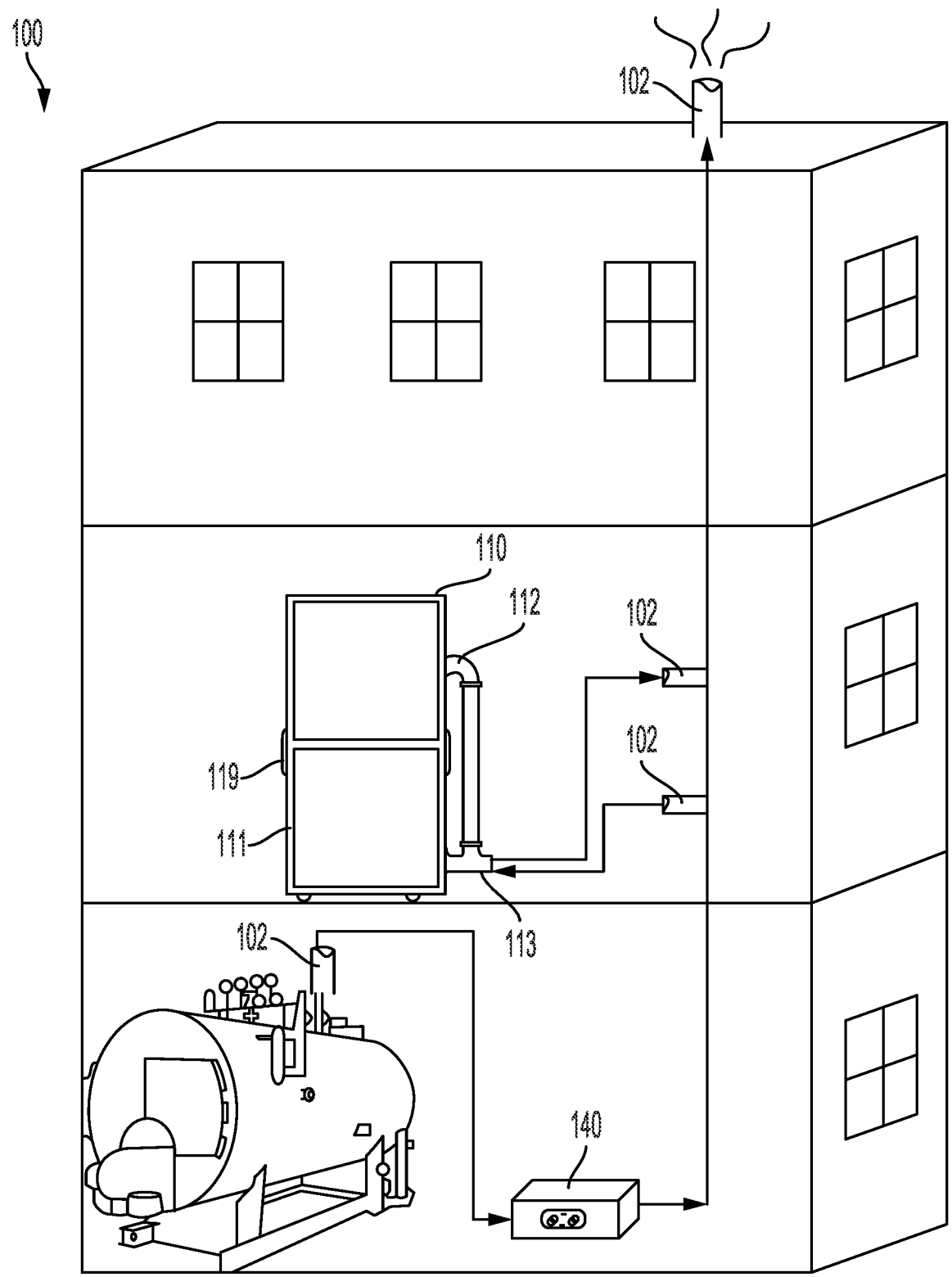
FIG. 5 is a flowchart representation of one variation of the system.
Figure 6:
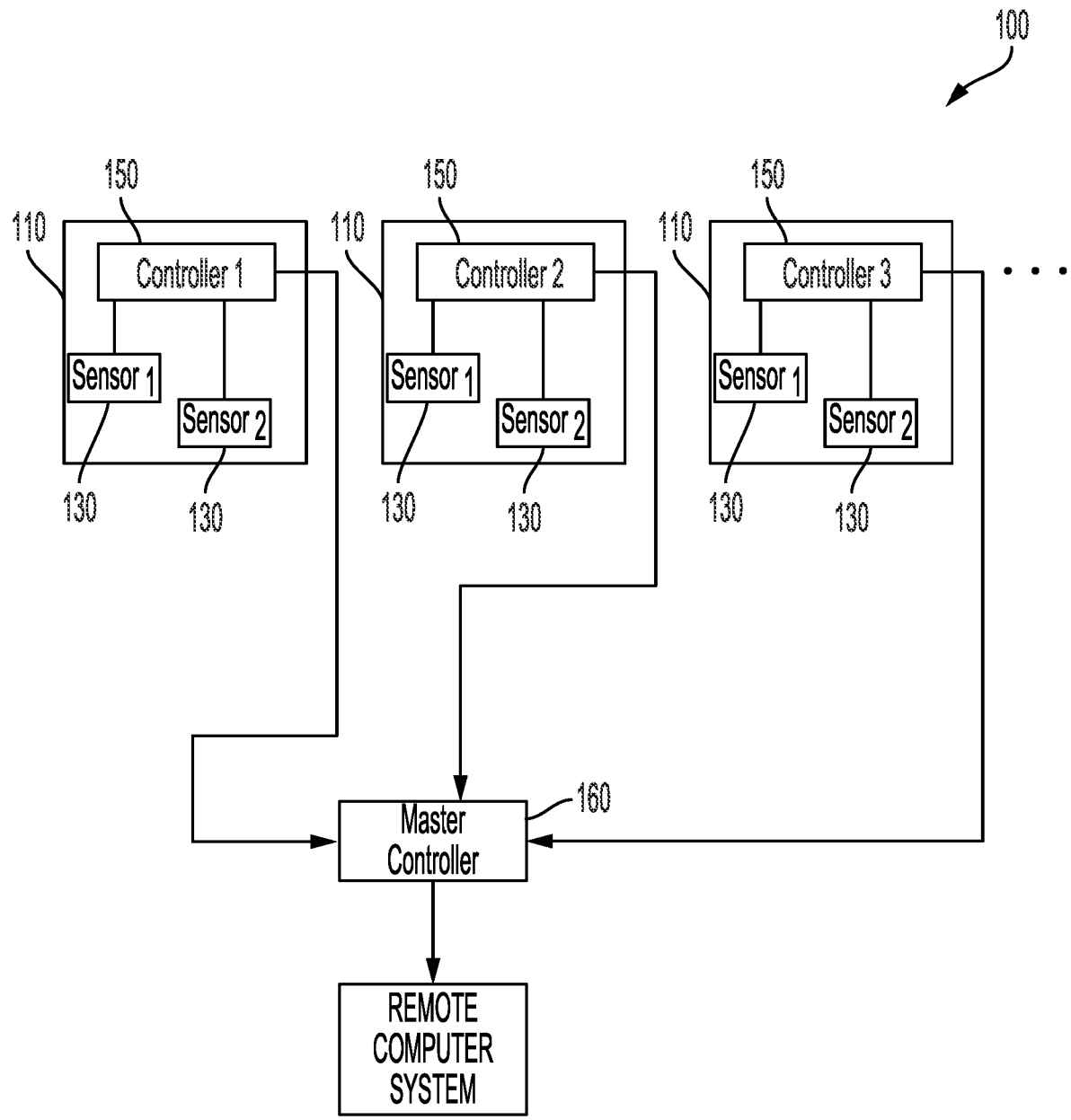
FIG. 6 is an electrical block diagram of one variation of the system.

As shown in FIG. 5, the system 100 can further include a valve 140 interposed between the housing inlet 113 and the first access tap on the exhaust stack 102 and configured to close at the housing inlet 113 to prevent the exhaust gas stream from entering the housing inlet 113.

In one variation, the valve 140 is configured to operate in an open position to convey the portion of the exhaust gas stream through the emissions capture reaction vessel 110 and in a closed position to prevent the portion of the exhaust gas stream from entering the housing 111 via the housing inlet 113. In this variation, a user (e.g., technician, custodial staff, administrator, manager) affiliated with the building can operate (e.g., turn, rotate) the valve 140 to an open position such that the exhaust gas stream can flow from the first access tap on the exhaust stack 102 into the housing inlet 113 of the emissions capture reaction vessel 110. The user can also operate the valve 140 in a closed position to reduce movement of the exhaust gas stream from entering into the emissions capture reaction vessel 110.

Thus, the user can quickly service the emissions capture reaction vessel 110—such as removing the reaction media container 114 and the volume of reaction media within the reaction media container 114, filling the reaction media container 114 with new reaction media, and returning the reaction media container 114 to the housing 111—once the valve 140 is in a closed position.

3.5 Door+Interlock

The emissions capture reaction vessel 110 further includes a door 118 configured to open to enable transfer of a replacement volume of reaction media into the emissions capture reaction vessel 110 and an interlock 119 coupled to the door.

In one variation, the emissions capture reaction vessel 110 can include a bag removably coupled to the reaction media container 114 and configured to house the volume of the reaction media. The reaction media can extract the constituent gas from gas flowing through the first emissions capture reaction vessel 110 and capture constituent gas. In this variation, the door 118 is configured to open to enable transfer of a replacement bag configured to house the volume of the reaction media.

In yet another variation, the door 118 is configured to enable transfer of a replacement volume of reaction media into the reaction media container 114 within the housing 111 of the emissions capture reaction vessel 110. In this variation, the valve 140 is arranged between the housing inlet 113 and the first access tap on the exhaust stack 102 and configured to close at the housing inlet 113 to prevent the portion of the exhaust gas stream from flowing through the emissions capture reaction vessel 110 and the interlock 119 is coupled to the door 118 and configured to open the door in response to a threshold duration of time of closure of the valve 140, and thereby prevents gas from exiting the emissions capture reaction vessel 110 through the door 118 when the emissions capture reaction vessel 110 is serviced.

3.6 Couplers

The system 100 can further include a set of couplers 120 interposed between the emissions capture reaction vessel 110 and the exhaust stack 102.

In one implementation, a first coupler 120, in the set of couplers 120, is configured to fluidly couple to the first access tap at the first height on the exhaust stack 102 and a second coupler 120, in the set of couplers 120, is configured to fluidly couple to the second access tap at the second height, greater than the first height, on the exhaust stack 102. In this implementation, the housing inlet 113 is coupled to the first coupler 120 and configured to receive the portion of the exhaust gas stream from the exhaust stack 102 via the first coupler 120 and the housing outlet 112 is coupled to the second coupler 120 and configured to return the portion of the exhaust gas stream back to the exhaust stack 102 via the second coupler 120.

4. Sensors

Generally, the system 100 includes a set of sensors 130 coupled to the emissions capture reaction vessel 110 and each sensor, in the set of sensors 130, is configured to collect non-optical data—such as concentration of gas, gas flow rate, and/or temperature of gas—as gas (e.g., carbon dioxide greenhouse gases) moves through the emissions capture reaction vessel 110 during a processing cycle.

In one implementation, the system 100 includes a first sensor 130 arranged proximal the housing inlet 113 and a second sensor 130 arranged proximal the housing outlet 112. The first sensor 130 is configured to collect non-optical data—such as concentration of gas, gas flow rate, and/or temperature—of the portion of the exhaust gas stream entering the housing via the housing inlet 113 during a processing cycle and the second sensor 130 is configured to collect non-optical data—such as concentration of gas, gas flow rate, and/or temperature—of the portion of the exhaust gas stream exiting the housing via the housing outlet 112.

4.1 Gas Sensors

In one variation, the system 100 includes a set of gas sensors 130 configured to output signals corresponding to a concentration (e.g., in parts per million): of constituent gas from the portion of the exhaust gas stream (e.g., constituent gas greenhouse gases) exiting the first access tap on the exhaust stack 102 within and/or on a building; and of constituent gas from the portion of the exhaust gas stream (e.g., processed gas) exiting the housing outlet 112 of the emissions capture reaction vessel 110 back into the second access tap of the exhaust stack 102.

In one variation, the system 100 includes a first gas sensor 130 arranged proximal the housing inlet 113 and configured to output a first signal corresponding to a first concentration of the constituent gas (e.g., carbon dioxide) from the exhaust gas stream entering the first housing via the housing inlet. The system 100 also includes a second gas sensor 130 arranged proximal the housing outlet 112 and configured to output a second signal corresponding to a second concentration of constituent gas (e.g., carbon dioxide) from the exhaust gas stream, less than the first concentration of gas, exiting the housing outlet 112 of the emissions capture reaction vessel 110 back into the second access tap of the exhaust stack 102.

In another variation, the system 100 includes a spectrometer configured to detect a concentration of constituent gas (e.g., carbon dioxide) from the portion of the exhaust gas stream exiting the exhaust stack 102 and a second concentration of constituent gas (e.g., carbon dioxide) from the portion of the exhaust gas stream, less than the first concentration of gas, exiting the housing outlet 112 of the emissions capture reaction vessel 110.

Additionally and/or alternatively, the system 100 can include a first gas flow sensor 130—such as a wire anemometer or other gas flux sensor 130—arranged proximal the housing inlet 113 and configured to output a first signal corresponding to a first flow rate of constituent gas (e.g., carbon dioxide) from the exhaust gas stream entering the housing via the housing inlet. The system 100 also includes a second gas flow sensor 130—such as a wire anemometer or other gas flux sensor 130—arranged proximal the housing outlet 112 and configured to output a second signal corresponding to a second flow rate of constituent gas (e.g., carbon dioxide) from the exhaust gas stream exiting the housing via the housing outlet 112.

Once the system 100 is deployed proximal the exhaust stack 102 in and/or on a building, the controller 150 can: sample these gas flow sensors 130, such as at a rate of 1 Hz or once per minute; store these data in local memory; and/or stream these data to the remote computer system for further processing.

4.2 Temperature Sensors

Furthermore, the system 100 can include a set of temperature sensors 130 configured to output signals corresponding to a temperature of the portion of the exhaust gas stream entering the housing via the housing inlet 113 and/or a temperature of the portion of the exhaust gas stream exiting the housing 111 via the housing outlet 112.

In one implementation, a first temperature sensor 130 is arranged proximal the housing inlet 113 and configured to output a first signal corresponding to a first temperature of the portion of the exhaust gas stream entering the first housing via the housing inlet. The system 100 also includes a second temperature sensor 130 arranged proximal the housing outlet 112 and configured to output a second signal corresponding to a second temperature of the portion of the exhaust gas stream (e.g., processed gas) exiting the housing via the housing outlet 112.

Once the system 100 is deployed proximal an exhaust stack 102 in and/or on the building, the controller 150 can: sample these temperature sensors, such as at a rate of once per minute or once per hour; store these data in local memory; and/or stream these data to the remote computer system for further processing.

5. Controller and Communications

As described above, the controller 150 can: sample the foregoing sensors continuously or intermittently, such as once per minute; compress and store these raw data locally; and intermittently broadcast these raw data to the remote computer system, such as once per day.

Alternatively, the controller 150 can execute methods and techniques described below to locally process these raw data and then transmit derived data and insights to the remote computer system, such as once per day.

For example, the controller 150 can interpret a temperature difference between the portion of the exhaust gas stream entering the housing inlet 113 and exiting the housing outlet 112 based on signals from a set of temperature sensors. The controller 150 can then activate the heating element 116, activate the fan 115 to influence the portion of the exhaust gas stream moving through the housing at a second speed, and/or close the valve to prevent the exhaust gas stream from entering the housing inlet, in response to the temperature of constituent gas exiting the housing via the housing outlet 112 falling below the temperature of constituent gas entering the housing via the housing inlet 113 by more than a threshold temperature difference.

In another example, the controller 150 can selectively close the valve 140 to reduce the concentration of constituent gas from the exhaust gas stream moving through the emissions capture reaction vessel 110, in response to the first concentration of gas exceeding a threshold concentration of gas.

In yet another example, the controller 150 can selectively close the valve 140 to prevent the portion of the exhaust gas stream entering the housing 111 via the housing inlet 113, in response to the door 118 opening.

5.1 Remote Computer System

The remote computer system—such as a remote server—can receive raw data from the set of sensors (e.g., gas sensors, gas flow sensors, temperature sensors) installed in the building and can manipulate these raw data: to estimate a gas flow rate of constituent gas; to interpret a temperature difference of the exhaust gas stream entering and exiting the housing 111 throughout the processing cycle; and to estimate a gas absorption rate and total constituent gas absorbed by the reaction media during a period of time in order to achieve accurate and repeatable conveyance of gas through the emissions capture reaction vessel 110. The remote computer system can also selectively trigger actuators within the system 100 (e.g., a fan 115, a heating element 116, a valve 140); and to execute actions (e.g., generate prompts, generate notifications) prompting a user (e.g., manager, custodial staff, maintenance worker) affiliated with the building to service the emissions capture reaction vessel 110, as further described below.

6. Processing Cycle: Carbon Capture

Generally, the remote computer system can generate a processing cycle and transmit this processing cycle to the controller 150. The controller 150 can then execute the processing cycle, implemented by the system 100, to capture gas (e.g., carbon dioxide, greenhouse gases) from an exhaust stack 102 located within a building.

In one implementation, during a first segment of the processing cycle, the controller can trigger the fan 115 to extract a portion of an exhaust gas stream from a first access tap on the exhaust stack 102 into the housing inlet 113 of the emissions capture reaction vessel 110. Then, during a second segment of the processing cycle, the reaction media within the reaction media container 114 of the emissions capture reaction vessel 110 can: extract constituent gas (e.g., carbon dioxide) from the portion of the exhaust gas stream; and capture the constituent gas. The reaction media can later be removed and thereby sequestering the captured constituent gas for future periods of time (e.g., 10 years, 100 years, 1,000 years, 10,000 years). Lastly, during a third segment of the processing cycle, the system 100 can return the portion of the exhaust gas stream (e.g., processed gas) from the housing outlet 112 of the emissions capture reaction vessel 110 into a second access tap on the exhaust stack 102 located within the building. Upon termination of the processing cycle, the controller 150 can read raw data from the set of sensors 130 (e.g., gas sensors, gas flow sensors, temperature sensors) and manipulate these data to calculate an amount of constituent gas absorbed by the reaction media, a gas flow rate, a gas concentration difference, a temperature difference of gas between the exhaust gas stream entering the housing 111 via the housing inlet 113 and exiting the housing 111 via the housing outlet 112 of the emissions capture reaction vessel 110.

Alternatively, the controller 150 can transmit these raw data to the remote computer system and the remote computer system can manipulate these data to calculate an amount of constituent gas absorbed by the reaction media, a gas flow rate, a gas concentration difference, a temperature difference of gas between the exhaust gas stream entering the housing 111 via the housing inlet 113 and exiting the housing 111 via the housing outlet 112 of the emissions capture reaction vessel 110.

7. Metrics: Gas Flow Rate+Temperature Difference+Gas Mass Flux

Furthermore, the remote computer system can maintain a temperature difference between the housing inlet 113 and the housing outlet 112 of the emissions capture reaction vessel 110 and gas flow and mass flux of gas moving through the emissions capture reaction vessel 110.

In one implementation, the controller 150 can read raw data from the set of sensors 130 (e.g., gas sensors, gas flow sensors, temperature sensors) and manipulate these raw data to track a temperature difference of the exhaust gas stream between the housing inlet 113 and the housing outlet 112 of the emissions capture reaction vessel 110 and the gas flow in the emissions capture reaction vessel 110.

Alternatively, the controller 150 can transmit these raw data to the remote computer system throughout the processing cycle in (near) real time and then the remote computer system can manipulate these raw data to track a temperature difference of the exhaust gas stream between the housing inlet 113 and the housing outlet 112 of the emissions capture reaction vessel 110 and the gas flow in the emissions capture reaction vessel 110.

7.1 Threshold Temperature Difference

In one variation, during the processing cycle, the controller 150 and/or the remote computer system can access a first temperature of gas from a first temperature sensor 130 arranged proximal the housing inlet 113 and configured to detect a temperature of the exhaust gas stream entering the housing inlet 113 of the emissions capture reaction vessel 110 from the first access tap on the exhaust stack 102. The controller 150 and/or the remote computer system can then access a second temperature of gas from a second temperature sensor 130 arranged proximal the housing outlet 112 and configured to detect a temperature of the exhaust gas stream exiting the housing outlet 112 of the emissions capture reaction vessel 110. Accordingly, the controller 150 and/or remote computer system can interpret a temperature difference between the exhaust gas stream entering the housing inlet 113 and exiting the housing outlet 112 of the emissions capture reaction vessel 110 based on the first temperature and the second temperature. In response to the second temperature falling below the first temperature by more than a threshold temperature difference, the controller 150 and/or remote computer system can selectively close the valve 140 to prevent the exhaust gas stream from entering the housing inlet 113.

In another variation, the controller 150 and/or the remote computer system can implement methods and techniques described above to interpret a temperature difference between the portion of the exhaust gas stream entering the housing inlet 113 and the portion of the exhaust gas stream exiting the housing outlet 112 based on the first temperature of gas and the second temperature of gas. Then, in response to the second temperature falling below the first temperature by more than a threshold temperature difference, the controller 150 and/or the remote computer system can activate the heating element 116—arranged proximal the housing outlet 112 of the emissions capture reaction vessel 110—to increase the temperature of gas flowing through the emissions capture reaction vessel 110.

In yet another variation, the controller 150 and/or remote computer system can implement methods and techniques described above to interpret a temperature difference between the exhaust gas stream entering the housing inlet 113 and exiting the housing outlet 112 of the emissions capture reaction vessel 110 based on the first temperature and the second temperature. In response to the second temperature falling below the first temperature by more than a threshold temperature difference (e.g., between 210 degrees Fahrenheit to 250 degrees Fahrenheit), the controller 150 and/or remote computer system can selectively activate the fan 115 to influence the portion of the exhaust gas stream moving through the housing at a second speed greater than the first speed.

Therefore, the controller 150 and/or the remote computer system can manipulate a temperature difference of the exhaust gas stream to within a minimum threshold temperature difference in order to achieve minimal to no generation of constituent gases (e.g., carbon monoxide) within the building or combustion of gas during a processing cycle.

7.2 Gas Concentration

In one variation, during the processing cycle, the controller and/or remote computer system can access a first concentration of constituent gas from a first gas sensor 130 arranged proximal the housing inlet 113 and configured to detect gas entering the housing via the housing inlet 113 from the first access tap on the exhaust stack 102. The controller 150 and/or remote computer system can then access a second concentration of constituent gas from a second gas sensor 130 arranged proximal the housing outlet 112 and configured to detect gas exiting the housing 111 via the housing outlet 112. Then, in response to the first concentration of constituent gas falling below a threshold concentration of constituent gas (e.g., 10 parts-per-million, 50 parts-per-million), the controller 150 and/or remote computer system can trigger the valve 140 to a closed position to prevent the exhaust gas stream from flowing through the emissions capture reaction vessel 110 from the first access tap on the exhaust stack 102.

Therefore, the controller 150 and/or remote computer system can monitor gas flow of the exhaust gas stream entering into the housing 111 via the housing inlet 113 from the first access tap on the exhaust stack 102 and can trigger the valve 140 to prevent the exhaust gas stream from entering the housing 111 and thereby enabling a user to open the door 118 and service the emissions capture reaction vessel 110.

7.3 Reaction Media Capacity

In one implementation, the controller 150 and/or remote computer system can manipulate data from the set of sensors to track the portion of constituent gas (e.g., carbon dioxide) that is absorbed by the reaction media within the reaction media container 114 of the emissions capture reaction vessel 110. More specifically, during a particular time period, the controller 150 and/or remote computer system can leverage data from the set of sensors to calculate the constituent gas absorbed by the reaction media within the reaction media container 114 of the emissions capture reaction vessel 110 for each processing cycle.

For example, at an initial time prior to the processing cycle, the remote computer system can access a maximum constituent gas capacity. Then, during the processing cycle, the controller 150 can trigger the fan 115 within the housing of the emissions capture reaction vessel 110 to extract a portion of exhaust gas stream from the first access tap on the exhaust stack 102 via the housing inlet 113 and the reaction media within the reaction media container 114 of the emissions capture reaction vessel 110 can extract a constituent gas (e.g., carbon dioxide) from the portion of the exhaust gas stream and capture the constituent gas. The captured constituent gas can be stored within a container (e.g., tube, bucket, bottle) coupled to the reaction media container 114 as described above.

The controller 150 can then trigger the fan 115 to return the portion of exhaust gas stream (e.g., processed gas) from the housing outlet 112 back to the second access port on the exhaust stack 102 located within the building. During the processing cycle, the controller 150 can access raw data from the set of sensors and transmit these data to the remote computer system to calculate constituent gas absorbed by the reaction media during the processing cycle that is stored in the container (e.g., tube, bucket, bottle). Then, in response to the constituent gas absorbed by the reaction media falling below the maximum constituent gas capacity, the controller 150 can execute a second processing cycle.

During the second processing cycle, the controller 150 can trigger the fan 115 within the housing of the emissions capture reaction vessel 110 to extract a next portion of the exhaust gas stream from the first access port on the exhaust stack 102 via the housing inlet 113 and the reaction media within the reaction media container 114 can extract a constituent gas (e.g., carbon dioxide) from this portion of the exhaust gas stream and capture the constituent gas. The constituent gas can be stored within the container (e.g., tube, bucket, bottle) coupled to the reaction media container 114. The controller 150 can then trigger the fan 115 to return this portion of exhaust gas stream (e.g., processed gas) from the housing outlet 112 back to the second access port on the exhaust stack 102 located within the building.

Accordingly, the controller 150 and/or remote computer system can calculate constituent gas absorbed by the reaction media during the second processing cycle that is stored in the container (e.g., tube, bucket, bottle) and calculate a total constituent gas absorbed by the reaction media during the first processing cycle and the second processing cycle. Then, in response to the total constituent gas absorbed by the reaction media approaching the maximum constituent gas capacity of the reaction media, the controller 150 and/or remote computer system can generate a notification indicating removal and replacement of the container and the volume of reaction media within the reaction media container 114 of the emissions capture reaction vessel 110; and serve the notification to a user (e.g., manager, administrator, custodial staff, technician) affiliated with the building.

7.3.1 Reaction Media Removal and Reloading

Once the total constituent gas absorbed by the reaction media approaches the maximum gas capacity of the reaction media, a user (e.g., custodial staff, technician) affiliated with the building can open the door 118 of the emissions capture reaction vessel 110 and remove the reaction media container 114 and/or the container with the volume of reaction media and thus the total captured constituent gas, from the emissions capture reaction vessel 110. The user can then reload the reaction media container 114 with a new container with the volume of reaction media into the housing of the emissions capture reaction vessel 110.

In one variation, the user can receive the notification prompting the user to remove the container with the volume of reaction media and reload new reaction media within the emissions capture reaction vessel 110 via a user portal. The user can then remove the container with the reaction media housed within the reaction media container 114 and thus the total captured constituent gas and the container can be transported to a facility for sequestering. The user can then replace the container with a new container configured to house a volume of new reaction media.

For example, a computing device—accessible by custodial staff affiliated with the building—can receive the notification prompting custodial staff to replace the container with reaction media via the user portal. The custodial staff can then: turn the valve 140 to a closed position; open the housing 111 of the emissions capture reaction vessel 110; and remove the volume of reaction media and thus the total captured constituent gas in the container from the reaction media container 114 within the housing 111 into a bin that can be transported to a warehouse for sequestering. The user can then: replace the container with a new container with new reaction media; close the housing 111 of the emissions capture reaction vessel 110; and turn the valve 140 to an open position to enable gas to move from the access tap on the exhaust stack 102 into the housing inlet 113 of the emissions capture reaction vessel 110. The controller 150 can then execute a next processing cycle with the new reaction media and repeat these methods and techniques for each other processing cycle and for each other new reaction media.

Additionally or alternatively, the user can implement the methods and techniques described above to remove and replace the container with a new container with new reaction media into the reaction media container 114 arranged within the housing of the emissions capture reaction vessel 110 during a maintenance (e.g., cleaning, servicing) time period predefined by the user (e.g., manager, administrator, technician, custodial staff) affiliated with the building.

7. Variations: Set of Emissions Capture Reaction Vessels

The system 100 can be configured to include a set of emissions capture reaction vessels 110 (e.g., 3 emissions capture reaction vessels, 10 emissions capture reaction vessels, 20 emissions capture reaction vessels) to capture carbon corresponding to the carbon greenhouse gases (e.g., 2,000 parts-per-million of carbon dioxide, 10,000 parts-per-million of carbon dioxide, 80,000 parts-per-million of carbon dioxide) from an exhaust stack 102 coupled to a utility system—such as a boiler, a furnace, a water heater, a space heater, a drying machine, a fireplace, and/or a generator etc.—located within and/or on a building.

As shown in FIG. 3, in one implementation, the system 100 can be configured to include a set of emissions capture reaction vessels 110 connected in series for a low emitting exhaust stack 102 (e.g., a furnace emitting 10,000 parts-per-million of carbon dioxide) such that the container with reaction media within the reaction media container 114 of each emissions capture reaction vessel 110 can be replaced in sequential order according to a schedule.

As shown in FIG. 4, in another implementation, the system 100 can be configured to include a set of emissions capture reaction vessels 110 connected in parallel for a high emitting exhaust stack 102 (e.g., a boiler emitting 80,000 parts-per-million of carbon dioxide) such that the container with reaction media within the reaction media container 114 of each emissions capture reaction vessel 110 can be replaced during a particular time period.

7.1 Variation: Emissions Capture Reaction Vessels Connected in Parallel

In one variation, the system 100 can be configured to include a set of (e.g., two, three) emissions capture reaction vessels 110 connected in parallel such that the system 100 can capture carbon, from an exhaust stack 102 emitting a low carbon dioxide concentration emitting exhaust stack (e.g., a furnace emitting 10,000 parts-per-million of carbon dioxide) within a small-scale building (e.g., educational building, office building), in the set of emissions capture reaction vessels 110.

In one implementation, the system 100 can include: two emissions capture reaction vessels 110; a housing inlet manifold 126; a housing outlet manifold 128; a set of sensors 130; and a primary controller 160. In this example, the housing inlet manifold 126 is fluidly coupled to a first access tap at a first height on an exhaust stack 102 coupled to a furnace within an educational building and the housing outlet manifold 128 is fluidly coupled to a second access tap at a second height, greater than the first height, on the exhaust stack 102 coupled to the furnace.

The first emissions capture reaction vessel 110, in the set of emissions capture reaction vessels 110, includes: a first housing 111; a first housing inlet 113 arranged on the first housing 111, coupled to the housing inlet manifold 126, and configured to receive a first portion of exhaust gas stream (e.g., high concentration carbon dioxide), exhausting through the exhaust stack 102 and inbound to the first emissions capture reaction vessel 110, via the first access tap on the exhaust stack 102; and a first housing outlet 112, arranged on the first housing 111, coupled to the housing outlet manifold 128, and configured to return the first portion of exhaust gas stream (e.g., low concentration carbon dioxide) to the second access tap on the exhaust stack 102. The second emissions capture reaction vessel 110 includes: a second housing 111; a second housing inlet 113 arranged on the second housing 111, coupled to the housing inlet manifold 126, and configured to receive a second portion of exhaust gas stream (e.g., high concentration carbon dioxide), exhausting through the exhaust stack 102 and inbound to the second emissions capture reaction vessel 110, via the first access tap on the exhaust stack 102; and a second housing outlet 112 arranged on the second housing 111, coupled to the housing outlet manifold 128, and configured to return the second portion of the exhaust gas stream (e.g., low concentration carbon dioxide) to the second access tap on the exhaust stack 102.

For example, during a first time period, the primary controller 160 can trigger a first fan 115 arranged within the first emissions capture reaction vessel 110 to extract a first portion of exhaust gas stream from the first access tap on the exhaust stack 102 into the first housing inlet 113 of the first emissions capture reaction vessel 110 via the housing inlet manifold 126. The first emissions capture reaction vessel 110 can absorb a constituent gas (e.g., high concentration carbon dioxide) from the first portion of exhaust gas stream and capture the constituent gas (e.g., high concentration carbon dioxide) via the reaction media housed within the first reaction media container 114 and return the portion of exhaust gas stream (e.g., low concentration carbon dioxide) from the first housing outlet 112 to the second access tap on the exhaust stack 102 via the housing outlet manifold 128.

During the first time period, the primary controller 160 can trigger a second fan 115 arranged within the second emissions capture reaction vessel 110 to extract a second portion of exhaust gas stream from the first access tap on the exhaust stack 102 into the first housing inlet 113 of the first emissions capture reaction vessel 110 via the housing inlet manifold 126. The second emissions capture reaction vessel 110 can similarly absorb the constituent gas (e.g., high concentration carbon dioxide) from the second portion of exhaust gas stream and capture the constituent gas (e.g., high concentration carbon dioxide) via the reaction media housed within the second reaction media container 114 and return the portion of exhaust gas stream (e.g., low concentration carbon dioxide) from the second housing outlet 112 to the second access tap on the exhaust stack 102 via the housing outlet manifold 128.

During a second time period succeeding the first time period, the primary controller 160 can: receive a first signal from a first gas flow sensor 130 corresponding to a first gas flow rate of constituent gas from the exhaust gas stream entering the first housing 111 via the first housing inlet 113; and receive a second signal from a second gas flow sensor 130 corresponding to a second gas flow rate of constituent gas from the exhaust gas stream exiting the second housing 111 via the second housing outlet 112. The primary controller 160 can then estimate a gas flow rate of constituent gas based on the first signal and the second signal, and, in response to the total constituent gas absorbed by the reaction media in each emissions capture reaction vessel 110 approaching a constituent gas capacity of the volume of reaction media, the primary controller 160 can generate a notification indicating removal and replacement of the reaction media within the reaction media container 114 of each emissions capture reaction vessel 110; and transmit the notification to a user (e.g., manager, administrator, custodial staff, technician) affiliated with the educational building via a user portal.

Therefore, the system 100 can be configured to include a set of emissions capture reaction vessels 110 to capture carbon from a low carbon dioxide concentration emitting exhaust stack 102 coupled to a furnace within and/or on an educational building and the reaction media within each emissions capture reaction vessel 110 can be replaced during a particular time period.

7.2 Variation: Emissions Capture Reaction Vessels Connected in Series

In one variation, the system 100 can be configured to include a set of emissions capture reaction vessels 110 connected in series such that the system 100 can capture carbon, from a high carbon dioxide concentration emitting exhaust stack 102 (e.g., a boiler emitting 80,000 parts-per-million of carbon dioxide) within a large-scale building (e.g., industrial building), in the set of emissions capture reaction vessels 110.

In one implementation, the system 100 can include: two emissions capture reaction vessels 110; a set of sensors 130; and a primary controller 160. The first emissions capture reaction vessel 110 includes: a first housing inlet 113 configured to receive a portion of exhaust gas stream (e.g., high concentration carbon dioxide) from the first access tap on the exhaust stack 102; and a first housing outlet 112 configured to feed processed gas (e.g., low concentration carbon dioxide) into a second housing inlet 113 of the second emissions capture reaction vessel 110. The second emissions capture reaction vessel 110 includes the second housing inlet 113 configured to receive the processed gas from the first housing outlet 112 of the first emissions capture reaction vessel 110 and a second housing outlet 112 configured to return the processed gas (e.g., low concentration carbon dioxide) to the second access tap on the exhaust stack 102.

For example, during a processing cycle, the primary controller 160 can trigger a first fan 115 to extract a first portion of exhaust gas stream from the exhaust stack 102 into the first housing inlet 113 of the first emissions capture reaction vessel 110. During a first time period, the first emissions capture reaction vessel 110 can then capture constituent gas from the portion of the exhaust gas stream via reaction media within the first reaction media container 114 and feed processed gas (e.g., low concentration carbon dioxide) from the first housing outlet 112 to the second housing inlet 113 of the second emissions capture reaction vessel 110. During a second time period succeeding the first time period, the second emissions capture reaction vessel 110 can capture constituent gas via reaction media within the second reaction media container 114 and return processed gas (e.g., low concentration carbon dioxide) from the second housing outlet 112 to the second access tap on the exhaust stack 102.

During a second time period succeeding the first time period, the primary controller 160 can: receive a first signal from a first gas flow sensor 130 corresponding to a first gas flow rate of constituent gas from the exhaust gas stream entering the first housing 111 via the first housing inlet 113; and receive a second signal from a second gas flow sensor 130 corresponding to a second gas flow rate of constituent gas from the exhaust gas stream exiting the second housing 111 via the second housing outlet 112. The primary controller 160 can then: estimate a gas flow rate of constituent gas based on the first signal and the second signal; and, in response to the total constituent gas absorbed by the reaction media in each emissions capture reaction vessel 110 approaching a constituent gas capacity of the volume of reaction media, generate a notification indicating removal and replacement of the reaction media within the reaction media container 114 of each emissions capture reaction vessel 110; and transmit the notification to a user (e.g., manager, administrator, custodial staff, technician) affiliated with the educational building via a user portal.

Therefore, the system 100 can be configured to include a set of emissions capture reaction vessels 110 to capture carbon from a high carbon dioxide concentration emitting exhaust stack 102 connected to a boiler within and/or on an industrial building and the first emissions capture reaction vessel 110 can be replaced during a first time period and the second emissions capture reaction vessel 110 can be replaced during a second time period succeeding the first time period.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A system for capturing a constituent gas from an air supply comprising:
a housing;
a reaction media arranged within the housing, the reaction media configured to capture a portion of a constituent gas from an air supply of an external area of the housing, wherein the reaction media converts the portion of the constituent gas into a carbon product during a processing cycle for sequestration of the carbon product combined with the reaction media, wherein the reaction media is removed based on capturing and converting a threshold amount of the constituent gas;
a housing inlet arranged on the housing and configured to receive the air supply and feed the air supply toward the reaction media;
a housing outlet arranged on the housing and configured to return the air supply exiting the reaction media back to the external area of the housing;
a fan arranged within the housing and configured to influence the air supply from the housing inlet, through the reaction media, and through the housing outlet;
a first temperature sensor proximal the housing inlet and configured to output a first signal corresponding to a housing inlet temperature of the air supply entering the housing via the housing inlet;
a second temperature sensor proximal the housing outlet and configured to output a second signal corresponding to a housing outlet temperature of the air supply exiting the housing via the housing outlet;
a heating element arranged within the housing; and
a controller including a processor to execute computer-readable instructions to perform functions of:
interpret a temperature difference between the air supply entering the housing inlet and the air supply exiting the housing outlet based on the first signal and the second signal; and
selectively activate the heating element to maintain the temperature difference of the air supply flowing through the housing below a threshold temperature difference.

2. The system of claim 1, further comprising:
a first gas sensor proximal the housing inlet and configured to output a first signal corresponding to a first concentration of the constituent gas entering the housing via the housing inlet;
a valve arranged and configured to close at the housing inlet to prevent the air supply from entering the housing inlet; and
the controller configured to trigger the valve to a closed position to prevent the air supply from flowing through the housing inlet in response to the first concentration of the constituent gas falling below a threshold concentration of constituent gas.

3. The system of claim 1, further comprising a reaction media container arranged in the housing and configured to house the reaction media.

4. The system of claim 3, wherein the reaction media container includes a baghouse to house a volume of the reaction media or store a volume of the reaction media after extracting the constituent gas.

5. The system of claim 1, wherein the housing inlet receives the air supply from indoor air or a heating ventilation and air conditioning (HVAC) system.

6. The system of claim 1: wherein the housing inlet is configured to receive the air supply, the air supply characterized by a first carbon dioxide concentration;
wherein the reaction media absorbs carbon dioxide from the air supply to capture the constituent gas; and
wherein the housing outlet is configured to return the air supply back to the external area of the housing, the air supply returned back to the external area is characterized by a second carbon dioxide concentration less than the first carbon dioxide concentration.

7. The system of claim 1, further comprising:
a first gas sensor proximal the housing inlet and configured to output a first signal corresponding to a first concentration of the constituent gas from the air supply entering the housing via the housing inlet;
a second gas sensor proximal the housing outlet and configured to output a second signal corresponding to a second concentration of the constituent gas from the air supply exiting the reaction media via the housing outlet;
the controller configured to estimate a constituent gas absorption rate by the reaction media based on a difference between the first concentration of the constituent gas and the second concentration of the constituent gas; and
generating and transmitting a notification to replace the reaction media based on the constituent gas absorption rate.

8. The system of claim 1, further comprising:
a reaction media container housing the reaction media.

9. The system of claim 8, wherein the reaction media container includes a baghouse to house a volume of the reaction media or store a volume of the reaction media after extracting the constituent gas.

10. The system of claim 1, wherein the reaction media converts the portion of the constituent gas into the carbon product that comprises one of a carbonate, a higher concentration of gaseous carbon dioxide, an elemental carbon, an ethanol, and a calcium carbonate.

11. The system of claim 1, wherein the reaction media comprises a calcium oxide.

12. The system of claim 1, wherein the reaction media comprises a hydroxide.

13. The system of claim 1, wherein the reaction media comprises an amine.

14. The system of claim 1, wherein the reaction media comprises a calcium oxide, and wherein the portion of the constituent gas is carbon dioxide such that the reaction media interacts with the carbon dioxide to form a calcium carbonate.

15. The system of claim 1, further comprising:
a filter arranged within the housing proximal to the housing inlet, wherein the filter is configured to remove one or more certain constituent gases from the air supply prior to the air supply reaching the reaction media.

16. The system of claim 15, wherein the one or more certain constituent gases comprise one or more of a nitrogen oxide, a sulfur oxide, and a carbon monoxide.

17. The system of claim 1, further comprising:
the controller to further execute the computer-readable instructions to perform functions of:
tracking the portion of constituent gas that is captured by the reaction media to calculate a total constituent gas captured; and
generating and transmitting a notification to remove the reaction media based on the total constituent gas captured by the reaction media approaching the threshold amount of the constituent gas.

18. A system for capturing a constituent gas from an air supply comprising:
- a housing;
- a reaction media arranged within the housing, the reaction media configured to capture a portion of a constituent gas from an air supply of an external area of the housing;
- a housing inlet arranged on the housing and configured to receive the air supply on the housing and feed the air supply toward the reaction media;
- a housing outlet arranged on the housing and configured to return the air supply exiting the reaction media back to the external area of the housing;
- a first temperature sensor proximal the housing inlet and configured to output a first signal corresponding to a housing inlet temperature of the air supply entering the housing via the housing inlet;
- a second temperature sensor proximal the housing outlet and configured to output a second signal corresponding to a housing outlet temperature of the air supply exiting the housing via the housing outlet;
- a heating element arranged within the housing; and
- a controller including a processor to execute computer-readable instructions to perform functions of:
  - interpret a temperature difference between the air supply entering the housing inlet and the air supply exiting the housing outlet based on the first signal and the second signal; and
  - selectively activate the heating element to maintain the temperature difference of the air supply flowing through the housing below a threshold temperature difference.

* * * * *